(12) United States Patent
Sze

(10) Patent No.: US 10,271,635 B2
(45) Date of Patent: Apr. 30, 2019

(54) HAIR BRUSH

(71) Applicant: Tung Hing Plastic Manufactory Ltd., Kowloon (HK)

(72) Inventor: Ka Chuen Sze, Kowloon (HK)

(73) Assignee: Tung Hing Plastic Manufactory Ltd., Kowloon (HK)

( * ) Notice: Subject to any disclaimer, the term of this patent is extended or adjusted under 35 U.S.C. 154(b) by 590 days.

(21) Appl. No.: 14/956,674

(22) Filed: Dec. 2, 2015

(65) Prior Publication Data
US 2016/0157593 A1 Jun. 9, 2016

(30) Foreign Application Priority Data

Dec. 4, 2014 (GB) .................................. 1421635.2

(51) Int. Cl.
*A46B 3/20* (2006.01)
*A46B 3/04* (2006.01)
(Continued)

(52) U.S. Cl.
CPC ................. *A46B 3/20* (2013.01); *A46B 3/005* (2013.01); *A46B 3/04* (2013.01); *A46B 9/023* (2013.01);
(Continued)

(58) Field of Classification Search
CPC . B29C 45/0001; B29K 2021/003; A46B 3/20; A46B 3/005; A46B 3/04; A46B 9/023
See application file for complete search history.

(56) References Cited

U.S. PATENT DOCUMENTS

| 2,920,334 | A | | 1/1960 | Keller | |
|---|---|---|---|---|---|
| 3,766,590 | A | * | 10/1973 | Wachtel | ................... A46B 7/00 15/186 |
| 4,500,939 | A | * | 2/1985 | Gueret | ................... A46B 3/005 15/187 |

(Continued)

FOREIGN PATENT DOCUMENTS

| CH | 428661 A | 1/1965 |
|---|---|---|
| GB | 629632 | 3/1947 |

(Continued)

*Primary Examiner* — Shay Karls
(74) *Attorney, Agent, or Firm* — Heslin Rothenberg Farley & Mesiti P.C.; Adoplh Bohnstedt; Melvin Li

(57) ABSTRACT

One aspect of the present invention is concerned with a method of manufacture of a hair brush. The method has the steps of providing a base member having connection means at circumferential region thereof, providing a sheet material having a plurality of spikes extending from outwardly facing surface of the sheet material, the sheet material and the spikes are integrally formed by injection molding of a plastic(s) material selected from the group consisting of thermoplastics polyester elastomer (TPE-E), polyether block amide copolymer (TPE-A), thermoplastic polyurethane (TPU) and polyurethane (PU), with a hardness from substantially Shore D50 to D65, and with a flexural modulus from 30,000 PSI to 40,000 PSI, assembling the sheet material by fitting perimeter thereof to the circumferential region of the base member, the base member and the connection means are configured to allow the sheet material to secure to the base member. The outwardly facing surface assumes a convex curvature. In an assembled configuration, a cavity is defined between the sheet material and the base member. In use, when the spikes are under pressure the spikes are movable in response to the pressure, causing corresponding movement to the sheet material, the movement creating a cushioning effect.

14 Claims, 7 Drawing Sheets

(51) Int. Cl.
  *A46B 3/00* (2006.01)
  *A46B 9/02* (2006.01)
  B29C 45/00 (2006.01)
  *B29K 67/00* (2006.01)
  *B29K 75/00* (2006.01)
  *B29L 21/00* (2006.01)
  *B29K 77/00* (2006.01)
  *B29K 21/00* (2006.01)

(52) U.S. Cl.
  CPC .... *B29C 45/0001* (2013.01); *B29K 2021/003* (2013.01); *B29K 2067/00* (2013.01); *B29K 2075/00* (2013.01); *B29K 2077/00* (2013.01); *B29K 2995/007* (2013.01); *B29K 2995/0082* (2013.01); *B29L 2021/00* (2013.01)

(56) References Cited

U.S. PATENT DOCUMENTS

| | | | |
|---|---|---|---|
| 5,327,611 A | 7/1994 | Balster et al. | |
| 6,158,442 A * | 12/2000 | Piatetsky | A46B 11/0006 132/115 |
| 2005/0055788 A1 * | 3/2005 | Chang | A46B 17/06 15/186 |
| 2013/0055518 A1 * | 3/2013 | Jacob | A46D 1/02 15/160 |

FOREIGN PATENT DOCUMENTS

| | | |
|---|---|---|
| GB | 1309029 | 3/1973 |
| GB | 2118029 A | 10/1983 |
| GB | 2519307 A | 4/2015 |
| JP | 2001000245 A | 1/2001 |

\* cited by examiner

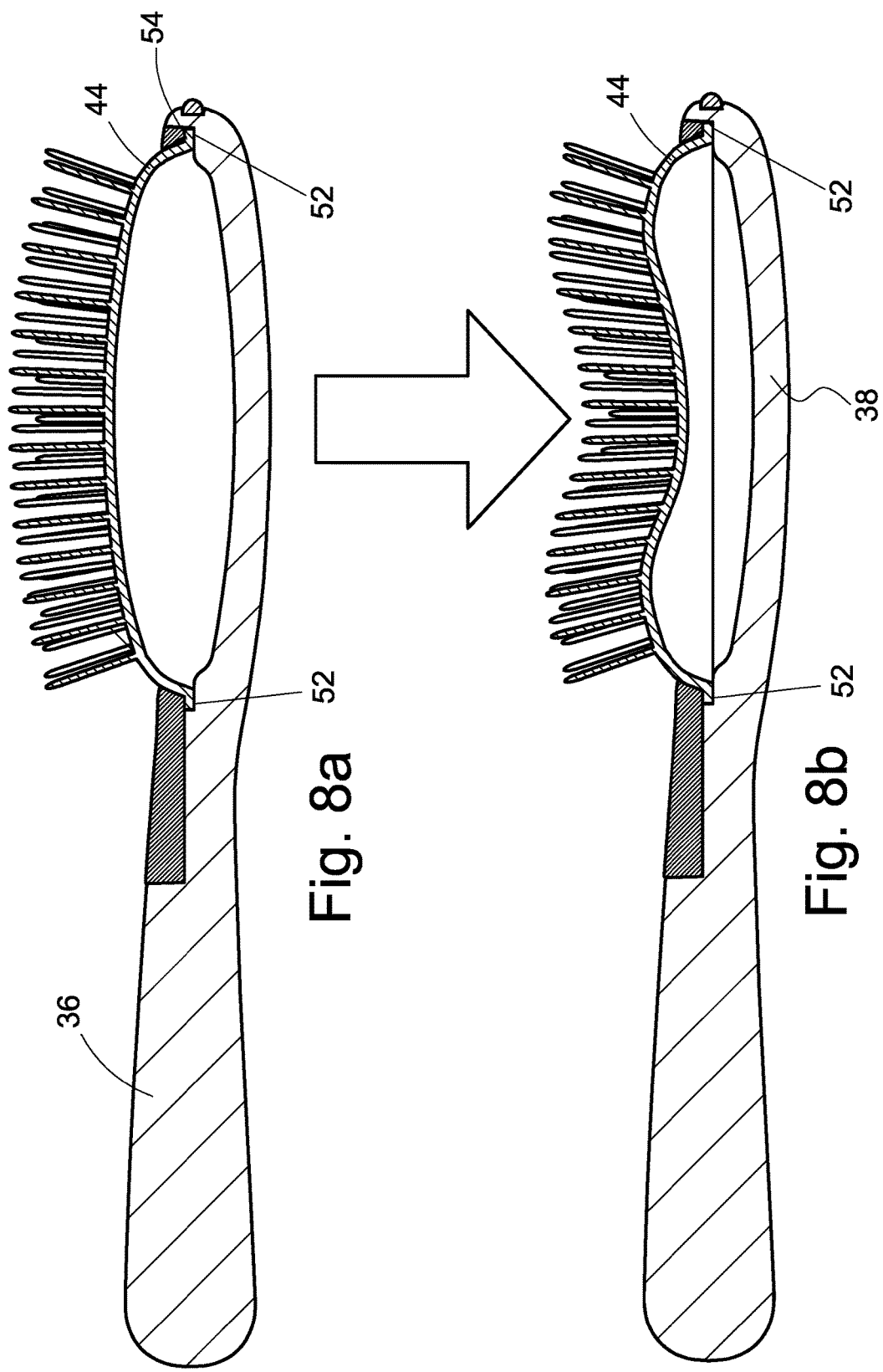

HAIR BRUSH

CROSS REFERENCE TO RELATED APPLICATION

This application is filed with a claim of priority from GB Patent Application No. 1421635.2 filed Dec. 4, 2014, contents of which are incorporated in this application in their entirety.

FIELD OF THE INVENTION

The present invention is concerned with a hair brush, and in particular an improved hair brush also known as cushion brush in the field of invention.

BACKGROUND OF THE INVENTION

There are many types of hair management tools in the market to suit different needs of users. One particular type of such tools is cushion brush. While cushion brushes generally are useful, different hair brushes suffer from different disadvantages. Some hair brushes tend to be non-durable due to its inherent physical structure, while other hair brushes are complex in their construction such that manufacturing thereof are costly and inefficient.

The present invention seeks to address such problems, or at least to provide an alternative to the public.

SUMMARY OF THE INVENTION

According to a first aspect of the present invention, there is provided a method of manufacture of a hair brush comprising the steps of providing a base member having connection means at a circumferential region thereof, providing a sheet material having a plurality of spikes extending from an outwardly facing surface of the sheet material, the sheet material and the spikes being integrally formed by injection molding of a plastic(s) material selected from the group of thermoplastics polyester elastomer (TPE-E), polyether block amide copolymer (TPE-A), thermoplastic polyurethane (TPU) and polyurethane (PU), with a hardness from substantially Shore D50 to D65, and with a flexural modulus from 30,000 PSI to 40,000 PSI, assembling the sheet material by fitting perimeter thereof to the circumferential region of the base member, the base member and the connection means being configured to allow the sheet material to secure to the base member, wherein, in an assembled configuration, the outwardly facing surface assumes a convex curvature, and a cavity is defined between the sheet material and the base member, such that in use when the spikes are under pressure the spikes are movable in response to the pressure, causing corresponding movement to the sheet material, the movement creating a cushioning effect.

Preferably, the connection means may include a recessed formation at the circumferential region of the base member, and the recessed formation is sized and shaped to receive the perimeter of the sheet material. The recessed formation may be defined between adjacent walls surrounding the circumferential region of the base member. The connection means may include a flange member for fitting at or covering the recessed formation after the sheet material is fitted to the base member, for further securing the sheet material to the base member.

The sheet material or the spikes may be free of nylon.

In an embodiment, the cavity may be free of filling material. Alternatively, there is provided a spongy filling between the sheet material and the base member, for controlling an extent of the cushioning movement.

According to a second aspect of the present invention, there is provided a hair brush comprising a utility portion and a handle portion, wherein the utility portion includes a base member, a sheet material providing a plurality of spikes extending from an outwardly facing surface of the sheet material, and connection means for securing the sheet material to the base member, wherein the base member is configured to receive perimeter of the sheet material at the connection means, the sheet material and the spikes together are integrally formed by injection molding of thermoplastics polyester elastomer (TPE-E) or polyether block amide copolymer (TPE-A) or a combination thereof, and the sheet material when assembled to the base member at the connection means is caused to project away from the utility portion, thus forming a hump defining a convex surface from which the plurality of spikes protrudes.

In an embodiment, the sheet material and the base member together define a cavity therebetween, such that in use when the plurality of spikes is under pressure the sheet material is movable and acts as a cushion pad.

Preferably, the connection means may include a recessed formation at the circumferential region of the base member, the recessed formation may be sized and shaped to receive the perimeter of the sheet material. The recessed formation may be defined by adjacent walls surrounding the circumferential region of the base member.

Suitably, the connection means may be include a flange member for fitting at the recessed formation after the sheet material is fitted to the base member, for further securing the sheet material to the base member.

The sheet material or the spikes may be free of nylon.

In one embodiment, the cavity may be free of any filling material. In an alternative embodiment, the cavity may be provided with a spongy filling between the sheet material and the base member, for controlling extent of possible cushioning movement of the sheeting material.

BRIEF DESCRIPTION OF THE DRAWINGS

Some embodiments of the present invention will now be explained, with reference to the accompanied drawings, in which:—

FIG. 3a is a cross section view of the hair brush FIG. 1;

FIG. 3b is an enlarged view showing a bristle of the hair brush of FIG. 3a;

FIG. 3c is a sheet material supporting bristles of the hair brush of FIG. 3a;

FIG. 8a is a cross section view taken along longitudinal axis of the hair brush of FIG. 4, the hair brush assuming a default configuration; and FIG. 8b corresponds to FIG. 8a but assuming a deformed configuration in response to pressure exerted on bristles of the hair brush.

DETAILED DESCRIPTION OF PREFERRED EMBODIMENTS OF THE INVENTION

Figure 1:
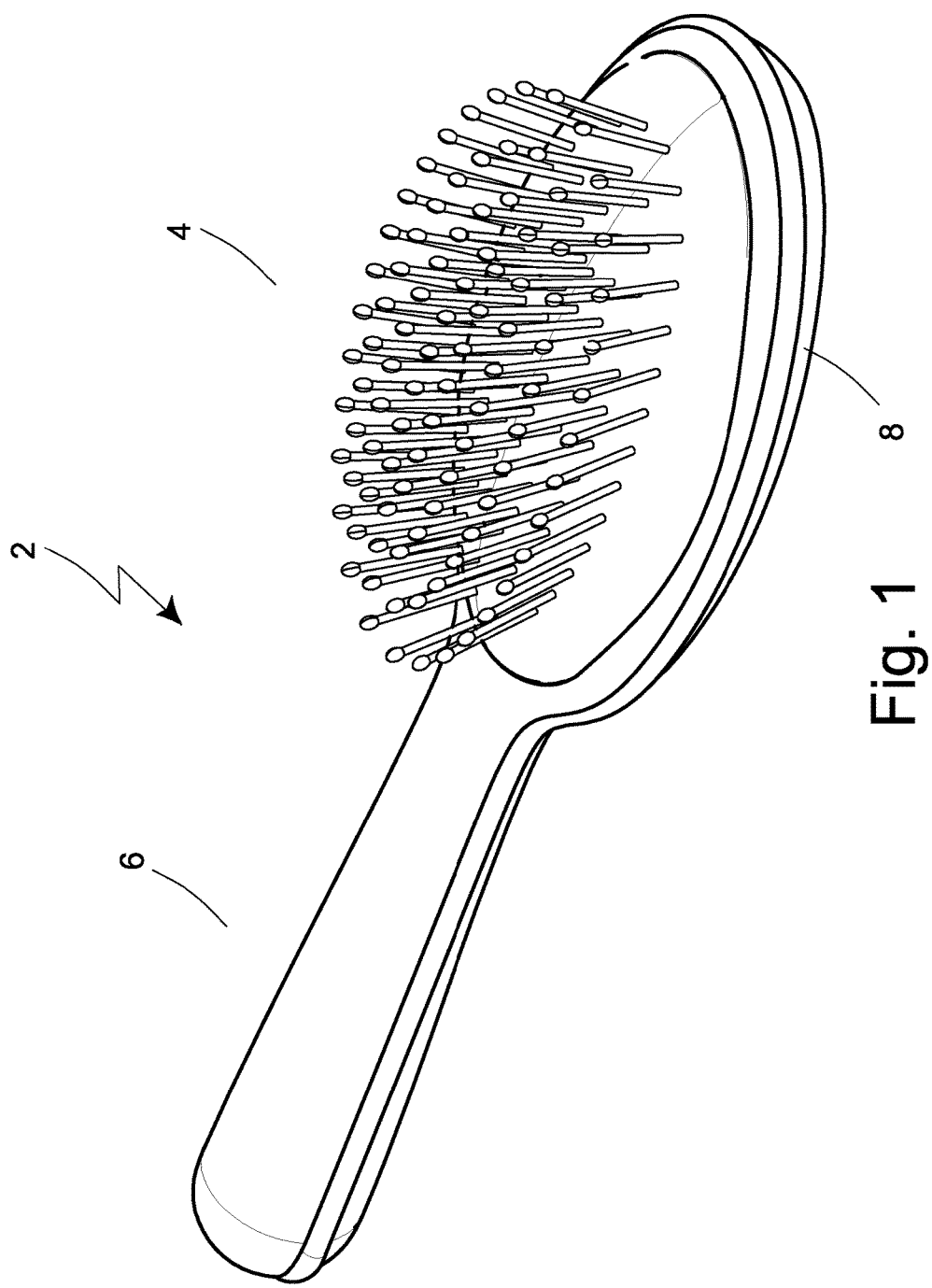
FIG. 1 is a perspective view showing a prior art hair brush.
Figure 2:
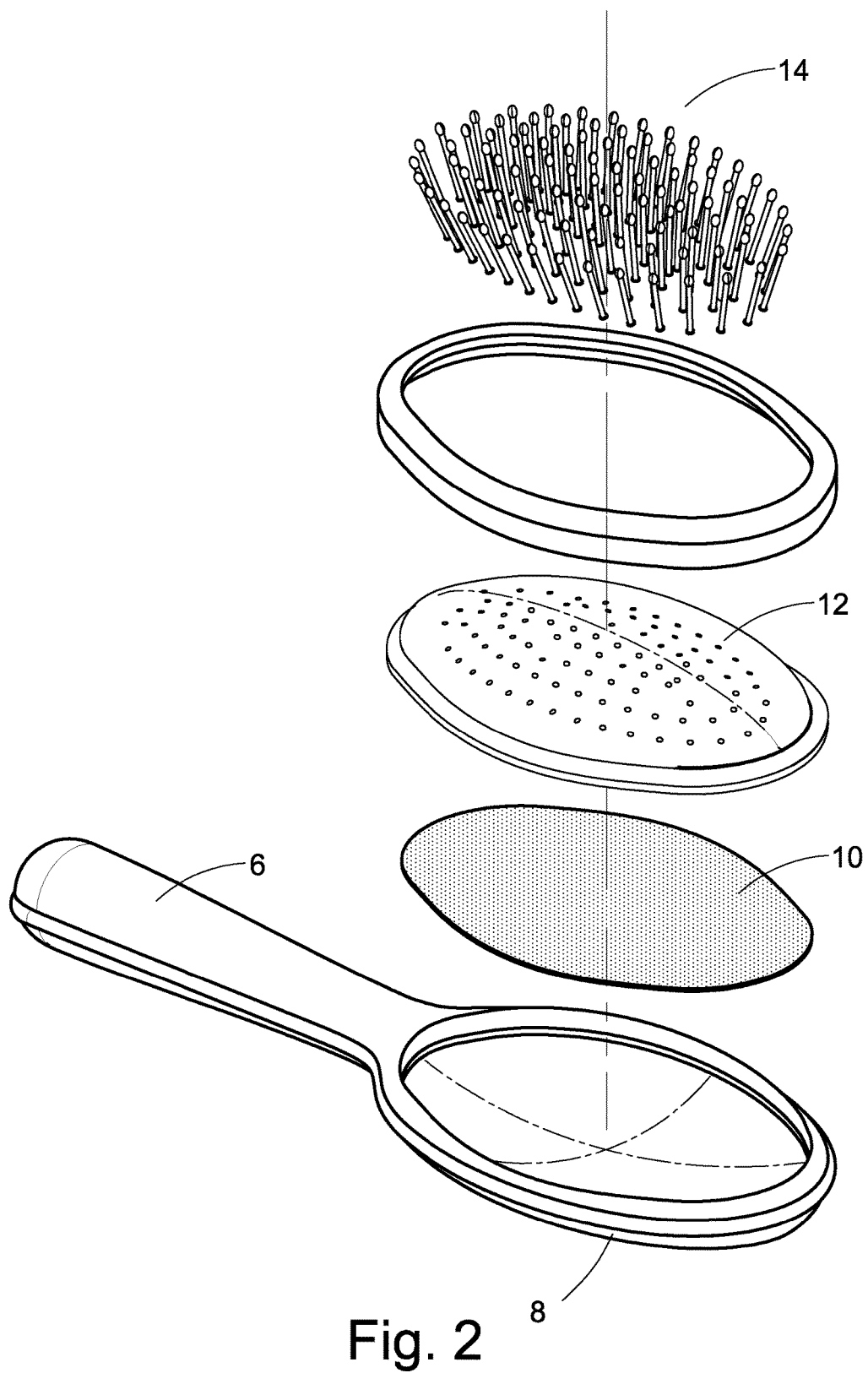
FIG. 2 is an exploded view showing components of the hair brush of FIG. 1.
Figure 3:
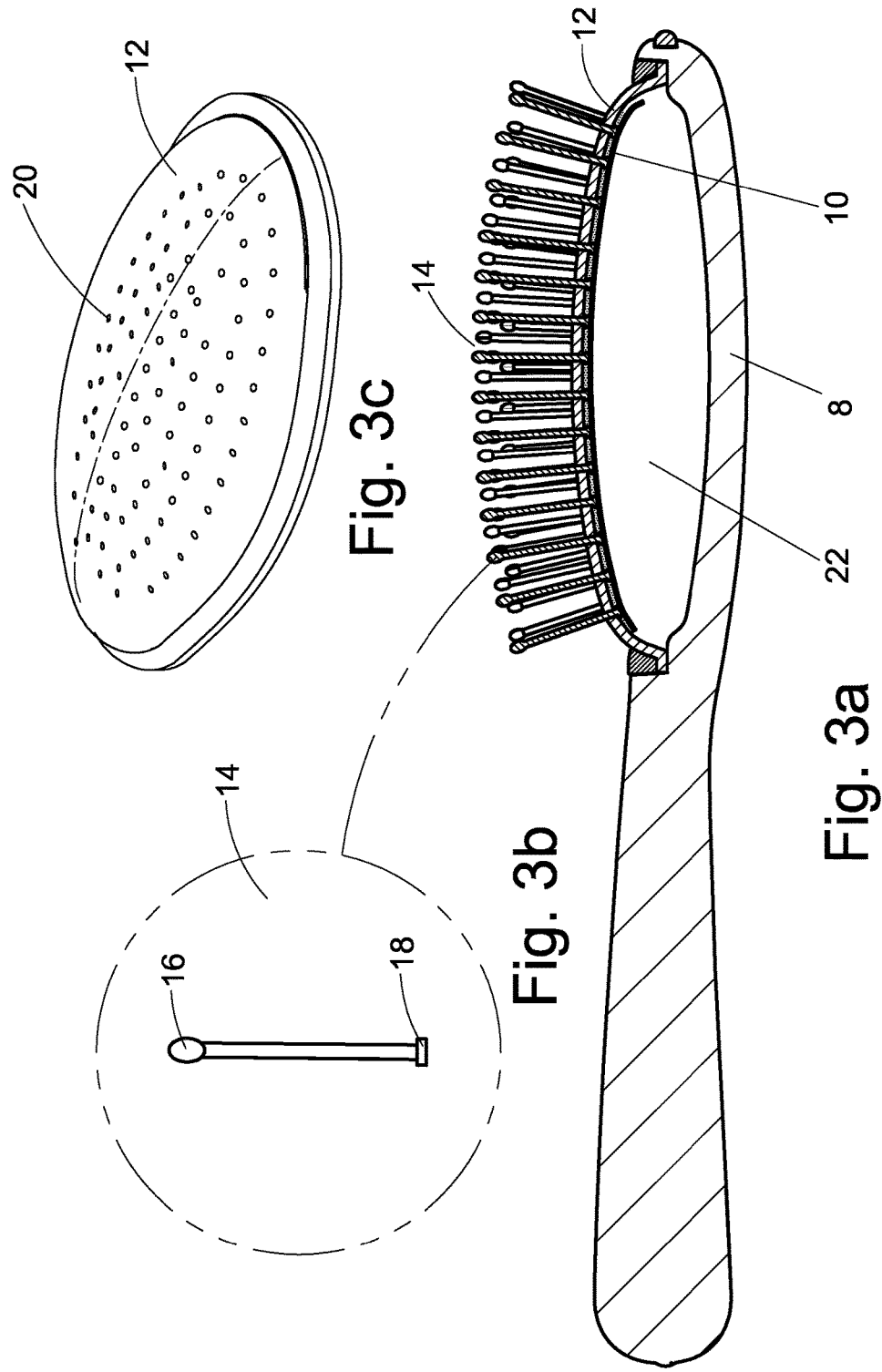

FIGS. 1 to 3a show a prior art hair brush 2. FIG. 2 shows the various components of the hair brush. In particular, the hair brush comprises a utility portion 4 at a front end and a handle portion 6 at the rear end or opposite end. The utility portion 4 has a brush body having a base member 8 from which the handle portion 6 extends. The brush body further includes a supporting membrane 10, a sheet material 12 and a plurality of bristles 14. The bristles 14 have rounded upper end 16 and enlarged lower end 18 resembling a nail head. The sheet material 12 is provided with a number of apertures 20 through which the bristles 14 protrude away from the base member 8. During manufacturing, the bristles 14 are assembled with the sheet material 12 by implanting or shooting the bristles 14 through the sheet material 12 such that majority length of the bristles 14 extend away from the base member 8. After the assembly, the lower end 18 of the bristles 14 protrude slightly through the sheet member 12 towards the supporting membrane 10. The lower end 18 seeks to prevent the bristles 14 from dislodging from the sheet material 12. The supporting membrane 10 seeks to provide vertical supporting such that the bristles 14 would not fall into a cavity 22 defined between the sheet material 12 and the base member 8. In other words, the lower end 18 and the supporting membrane 10 seek to maintain the bristles 14 in position.

Studies of the aforementioned prior art design indicates that it is problematic in a number of ways. For example, from a manufacturing point of view the involvement of a relatively large number of independent or separate parts (e.g. the plurality of bristles) necessarily increase manufacturing and assembly difficulties and costs. Further, shooting individual bristles 14 through the sheet member 12 requires much precision and thus increase technical difficulties. Yet further, while the provision of the enlarged nail head at the lower end 18 and the supporting membrane 10 can maintain the bristles 14 in position, repeated pressing against the supporting member 10 by the enlarged lower end 18 tend to puncture the supporting member 10, causing the supporting member 10 to loose its supporting function and allowing the bristles 14 to sink towards the base member 8. Alternatively, during repeated use of the brush 2 the apertures 20 of the base member 8 tend to enlarge in size, and the bristles 14 tend to dislodge away from the sheet material 12.

Figure 4:
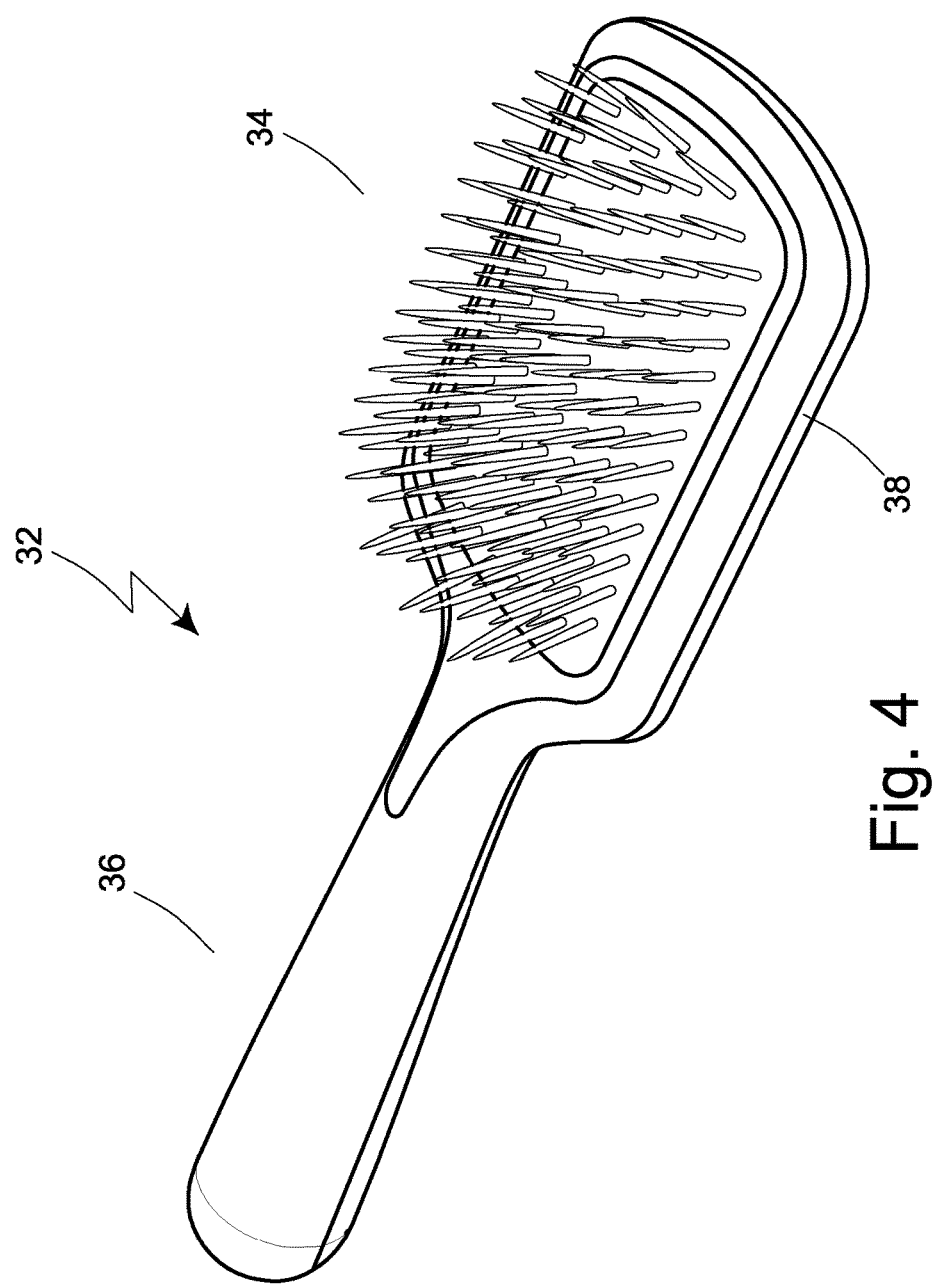
FIG. 4 is a perspective view of an embodiment of a hair brush according to the present invention.
Figure 5:
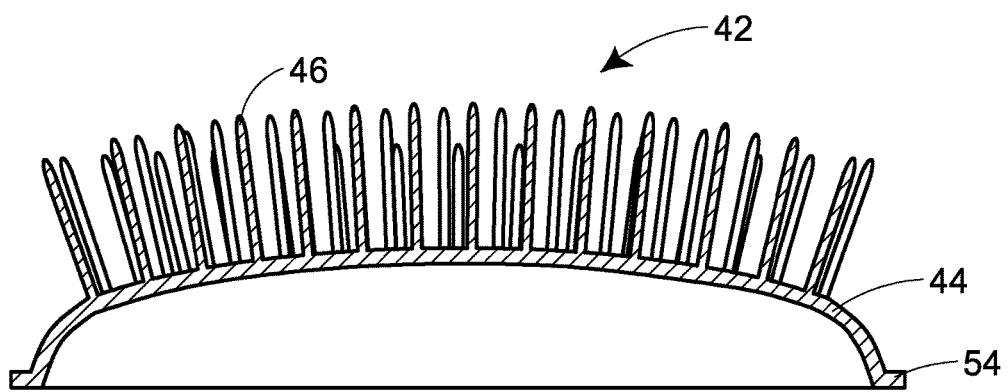
FIG. 5 is a cross section view taken along longitudinal axis of the part in FIG. 6.
Figure 6:
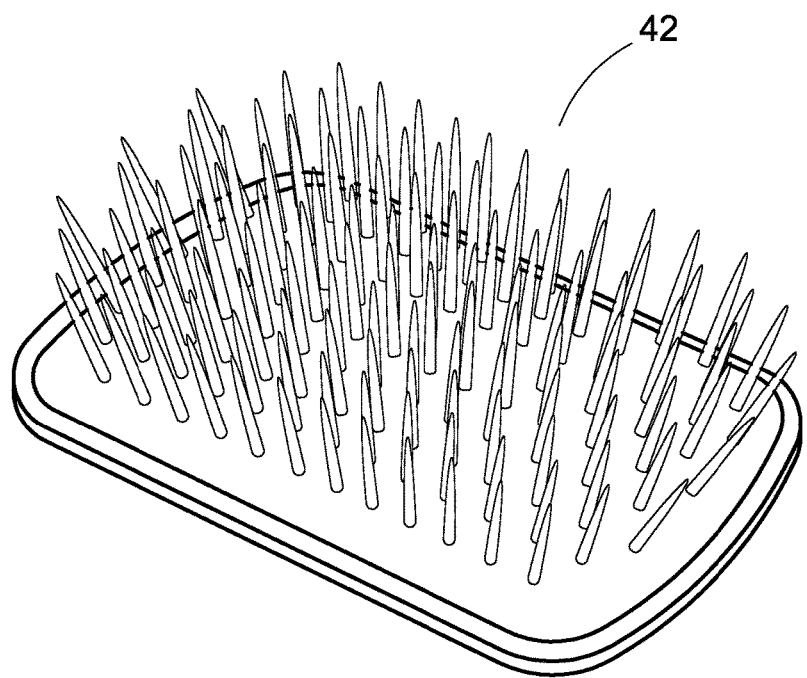
FIG. 6 is a perspective view of part of utility portion of the hair brush of FIG. 4.
Figure 7:
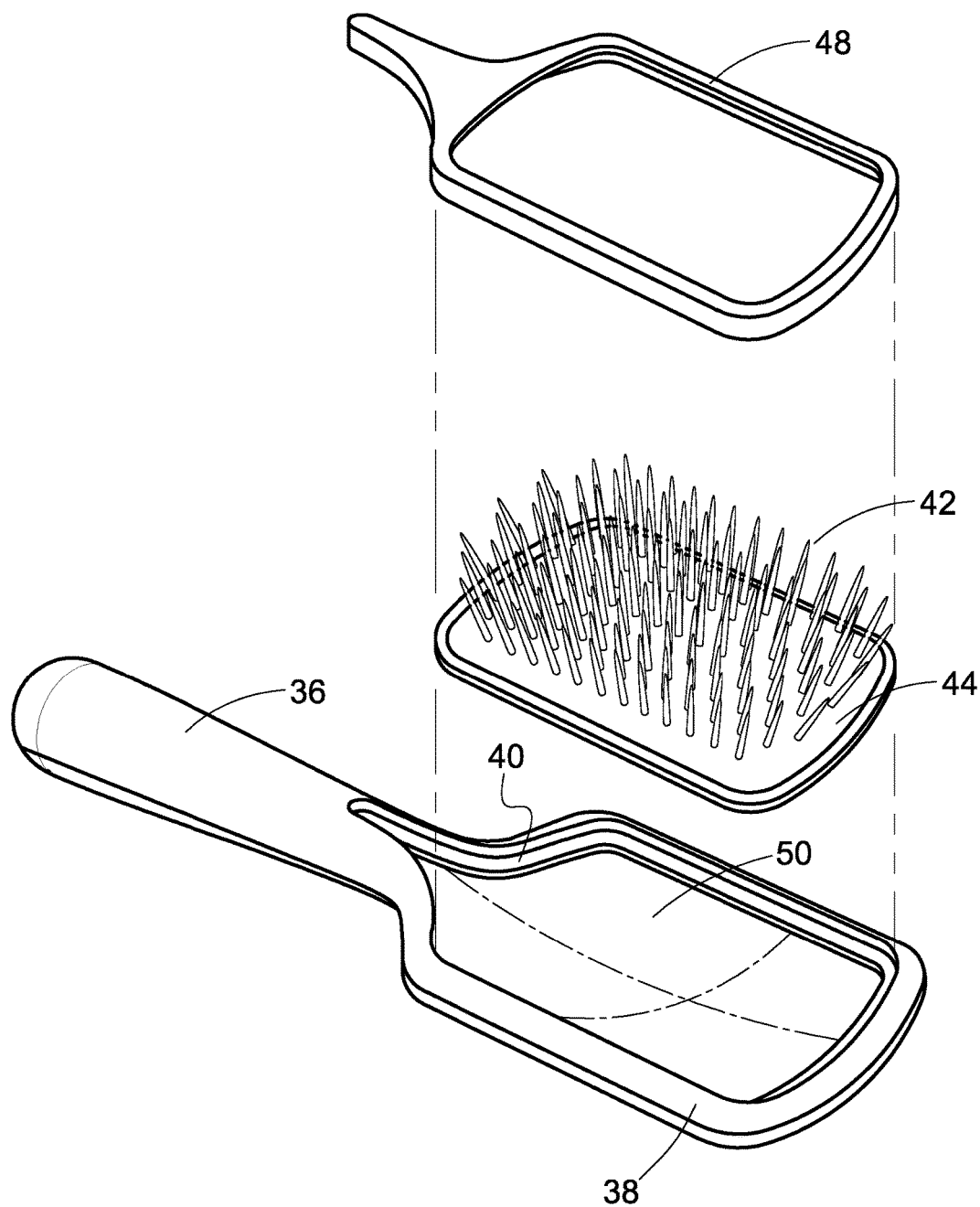
FIG. 7 is an exploded view of the hair brush of FIG. 4.

FIG. 4 is a schematic diagram of an embodiment of a hair brush, or cushion brush, according to the present invention. FIG. 7 is an exploded view of the hair brush. The hair brush is generally designated 32. The hair brush 32 has a utility portion 34 and a handle portion 36. The utility portion 34 has a body made of a base member 38 with upwardly extending circumferential wall 40, a bristled body 42 having a sheet material 44 as well as a plurality of bristles 46, and a connecting ring 48. The base member 38 together with the handle portion 36 is made of a relatively rigid polymeric material. The base member 38 has a bottom wall 50 and the circumferential wall 40 adjacent thereto. The bottom wall 50 and the vertical extending circumferential wall 40 together define a recessed formation 52 surrounding peripheral region in the base member 38. Please also see FIGS. 5-6.

The bristled body 42 including the sheet material 44 and the bristles 46 are made of a plastic(s) material of thermoplastics polyester elastomer (TPE-E), polyether block amide copolymer (TPE-A), thermoplastic polyurethane (TPU), polyurethane (PU) or a combination thereof. In this embodiment, the sheet material 44 is relatively thin and is generally rectangular in configuration. However, in other embodiments the sheet material 44 may be generally oval in configuration. The sheet material 44 defines a peripheral edge 54 acting as a flange for engaging with the recessed formation 52. The oval sheet material has a size slightly larger than central area defined by the recessed formation. The connecting ring 48 fits over the flange 54 for securing the sheet material 44 to the base member 38. Unlike in the prior art, the sheet material 12 is not in the form of a mesh layer or in a grid configuration. In this embodiment, the sheet material 44 and the bristles 46 made from the plastic(s) material are sized and shaped, or otherwise, configured such that they possess the physical characteristics with a hardness of substantially Shore D55 and a flexural modulus of substantially 35,000 PSI. Studies leading to the present invention demonstrate the hardness and the flexural modules of substantially Shore D50 to D65 and 30,000 PSI to 40,000 PSI, respectively, can still lead desired behavior of hair brushes made according to the present invention. The use of the particular plastic(s) material candidates and the hardness and flexural modules configuration are not arbitrary however. The studies show that the combination of characteristics of the materials used and characteristics of the integral base member and bristles together contribute to the desired behavior of hair brushes.

FIGS. 8a-8b show that the brush 32 need not possess other components. Specifically, there is no provision of supporting member arranged below the bristles to maintain the bristles 46 in relative position with the sheet material 44. Lower end of the bristles 46 does not have enlarged formation.

The hair brush 32 is made of firstly providing three components, namely the base member 38, the bristled body 42, and the connecting ring 48. The base member 38 is made of a stiff polymeric material for providing rigidity to the overall brush 32, although other suitable rigid material such as metallic or wood material may also be used. The bristled body 42, i.e. the sheet membrane 44 and the bristles 46, is integrally formed by injection moulding of thermoplastics polyester elastomer (TPE-E) or polyether block amide copolymer (TPE-A). The sheet membrane 44 has a size slightly larger than the area defined by the bottom wall of the base member 38. Due to the larger size, when the bristled body 42 is being installed to the base member 38 by bending the sheet material away 44 from the base member 38 such that effective width of the sheet material 44 is reduced to fit within the area of the bottom wall 50. Once the bristled body 42 is fitted with the area, the sheet material 44 is caused to flex outwardly away from the base member 38. In this embodiment, as described above the connecting ring 48 aids in securing the bristled body 42 to the base member 38. However, in other embodiments the base member 38 may have other configuration for providing a region for receiving the peripheral edge 54. For example, one other possible configuration is a parallel wall structure extending from the base member, in which the peripheral edge 54 tightly fits between the parallel walls. In such other embodiment, use of the connecting ring would be optional.

FIG. 8a shows the brush 32 in an assembled and default configuration. The sheet material 44 protrudes outwardly and forms a hump. A cavity is defined between the sheet material 44 and the base member 38. In use, when the bristles 46 contact hair and scalp of a user, pressure from the hair and scalp cause the sheet material 44 to deform and move into the cavity and towards the base member 38. Movement of the bristles 46 and deformation of the sheet material 44 creates a cushioning effect such that the use of the hair brush 32 is gentle on the user and comfortable. In other words, the bristles 46 is supported by the sheet material 44 in a floating manner and conforms to the shape of the head and hair of the user.

It is envisaged that the bristles body can more reliably manufactured. This is because it is made by injection molding in a one step manner. The use of an integral bristled body does away the use of for example, distinct or independent bristles and sheet material, shooting of the bristles to the sheet material and installation of supporting membrane. Further, due to the integrally molded bristled body the bristles move together with the sheet material such that the bristled body becomes more durable, and the bristles are unlikely to dislodge therefrom. Yet further, since the bristles and the sheet material integrally formed they move in synchronization in greater extend and produce a more comfortable cushioning effect. The particular use of TPE-E, TPE-A, TPU or PU also contributes to the efficacy of the brush. Studies leading to the present invention shows that TPE-E, TPE-A, TPU and PU are technically advantageous in that it possesses desired combination of durability, flexibility and comfort for contact with hair in use.

In this embodiment, the cavity is free of a filling material because air trapped in the cavity assists in the cushioning effect. However, in alternative embodiment the cavity may be optionally filled with a soft material, e.g. a sponge, for producing a desired cushioning effect.

During the course of the present invention, it was identified that designing a hair brush which was comfortable to use, easy and cost effective to manufacture, and durable were not apparent. However, these requirements were often perceived to mutually exclusive in nature. The present invention allows the production of a hair brush which can produce a hair brush which can provide a comfort touch and unexpectedly serve to detangle hair.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

The invention claimed is:

1. A method of manufacture of a cushion hair brush comprising the steps of:
   providing a base member having connection means at a circumferential region thereof;
   providing a combination of a non-perforated sheet material and a plurality of spikes that do not pass through a plurality of apertures of a top second sheet material and extend from an outwardly facing surface of the non-perforated sheet material, the non-perforated sheet material and the spikes being integrally formed by injection molding of one or the same plastic(s) material selected from the group consisting of thermoplastics polyester elastomer (TPE-E), polyether block amide copolymer (TPE-A), thermoplastic polyurethane (TPU) and polyurethane (PU) in one step, wherein by way of configuration of the sheet material and the spikes, the combination has a hardness from substantially Shore D50 to D65, and with a flexural modulus from 30,000 PSI to 40,000 PSI;
   assembling the combination by fitting perimeter thereof to the circumferential region of the base member, the base member and the connection means being configured to allow the sheet material to secure to the base member;
   wherein, in an assembled configuration, the outwardly facing surface assumes a convex curvature, and a cavity is defined between the sheet material and the base member, and in use when the spikes are under pressure the spikes are movable in response to the pressure, causing corresponding movement to the sheet material, the movement creating a cushioning effect.

2. A method as claimed in claim 1, wherein the connection means includes a recessed formation at the circumferential region of the base member, and the recessed formation is sized and shaped to receive the perimeter of the sheet material.

3. A method as claimed in claim 2, wherein the recessed formation is defined between adjacent walls surrounding the circumferential region of the base member.

4. A method as claimed in claim 2, wherein the connection means includes a flange member for fitting at or covering the recessed formation after the sheet material is fitted to the base member, for further securing the sheet material to the base member.

5. A method as claimed in claim 1, wherein the sheet material or the spikes are free of nylon.

6. A method as claimed in claim 1, wherein the cavity is free of filling material.

7. A method as claimed in claim 1, comprising a spongy filling between the sheet material and the base member, for controlling an extent of the cushioning movement.

8. A cushion hair brush comprising a utility portion and a handle portion, wherein the utility portion includes a base member, a combination of a non-perforated sheet material and a plurality of spikes extending from an outwardly facing surface of the sheet material, and connection means for securing the sheet material to the base member, the combination configured to engage the hair and/or scalp of a user during use, wherein the base member is configured to receive perimeter of the sheet material at the connection means, the non-perforated sheet material and the spikes together are integrally formed by injection molding of thermoplastics polyester elastomer (TPE-E) or polyether block amide copolymer (TPE-A) or polyurethane (PU) for both the non-perforated sheet material and the spikes in one step, wherein by way of configuration of the sheet material and the spikes, the combination has a hardness from substantially Shore D50 to D65, and with a flexural modulus from 30,000 PSI to 40,000 PSI, and the combination when assembled to the base member at the connection means is caused to project away from the base member, thus forming a hump defining a convex surface from which the plurality of spikes protrudes, wherein the connection means includes a recessed formation at the circumferential region of the base member, the recessed formation being sized and shaped to receive the perimeter of the sheet material, and wherein the connection means includes a flange member for fitting at the recessed formation after the sheet material is fitted to the base member.

9. A cushion hair brush as claimed in claim 8, wherein the sheet material and the base member together define a cavity therebetween, such that in use when the plurality of spikes is under pressure the sheet material is movable and acts as a cushion pad.

10. A cushion hair brush as claimed in claim 9, wherein the cavity is free of any filling material.

11. A cushion hair brush as claimed in claim 8, wherein the recessed formation is defined by adjacent walls surrounding the circumferential region of the base member.

12. A cushion hair brush as claimed in claim 8, wherein the sheet material or the spikes are free of nylon.

13. A cushion hair brush as claimed in claim 8, further comprising a spongy filling between the sheet material and the base member, for controlling an extent of possible cushioning movement of the sheeting material.

14. A method of manufacture of a cushion hair brush as claimed in claim 8.

* * * * *